(12) United States Patent
Simon

(10) Patent No.: US 8,120,456 B2
(45) Date of Patent: Feb. 21, 2012

(54) BALANCING CIRCUIT FOR A METAL DETECTOR

(75) Inventor: Joseph S. Simon, Jackson, WI (US)

(73) Assignee: Carnes Company, Inc., Pewaukee, WI (US)

( * ) Notice: Subject to any disclaimer, the term of this patent is extended or adjusted under 35 U.S.C. 154(b) by 0 days.

(21) Appl. No.: 13/007,385

(22) Filed: Jan. 14, 2011

(65) Prior Publication Data

US 2011/0109404 A1    May 12, 2011

Related U.S. Application Data

(62) Division of application No. 11/779,969, filed on Jul. 19, 2007, now Pat. No. 7,893,690.

(51) Int. Cl.
*H01F 21/00* (2006.01)
*G01N 27/72* (2006.01)

(52) U.S. Cl. .................................. 336/155; 324/233

(58) Field of Classification Search .................. 324/233, 324/235; 336/155
See application file for complete search history.

(56) References Cited

U.S. PATENT DOCUMENTS

| | | | |
|---|---|---|---|
| 3,404,338 A * | 10/1968 | Cannon | 324/620 |
| 3,872,380 A | 3/1975 | Gardiner | |
| 3,875,498 A | 4/1975 | Mahan et al. | |
| 4,024,468 A | 5/1977 | Hirschi | |
| 4,030,026 A | 6/1977 | Payne | |
| 4,099,116 A | 7/1978 | Tyndall | |
| 4,249,128 A | 2/1981 | Karbowski | |
| 4,263,551 A | 4/1981 | Gregory et al. | |
| 4,283,680 A | 8/1981 | Kerr | |
| 4,300,097 A | 11/1981 | Turner | |
| 4,303,879 A | 12/1981 | Podhrasky | |
| 4,334,191 A | 6/1982 | Podhrasky | |
| 4,334,192 A | 6/1982 | Podhrasky | |
| 4,439,734 A | 3/1984 | Weber | |
| 4,470,015 A | 9/1984 | Hirschi et al. | |
| 4,486,712 A | 12/1984 | Weber | |
| 4,507,612 A | 3/1985 | Payne | |
| 4,563,645 A | 1/1986 | Kerr | |
| 4,659,989 A * | 4/1987 | Kerr | 324/233 |
| 4,677,384 A | 6/1987 | Payne | |
| 4,700,139 A | 10/1987 | Podhrasky | |
| 4,709,213 A | 11/1987 | Podhrasky | |
| 4,949,037 A | 8/1990 | Abe | |
| 5,521,583 A | 5/1996 | Frahm et al. | |
| 5,691,640 A | 11/1997 | King | |
| 5,721,489 A | 2/1998 | Weaver et al. | |
| 7,061,236 B2 | 6/2006 | Britton | |

OTHER PUBLICATIONS

Office Action in MX/A/2010/010297—English translation, dated Jun. 11, 2010, received Jul. 19, 2010.

* cited by examiner

*Primary Examiner* — Bot Ledynh
(74) *Attorney, Agent, or Firm* — Michael Best & Friedrich LLP

(57) ABSTRACT

A balancing circuit for a metal detector. The metal detector includes an oscillating power source, a transmit coil connected to the oscillating power source, first and second receive coils inductively coupled to the transmit coil, a first amplitude balancing circuit connected to the first receive coil, and a first phase balancing circuit connected to the first receive coil. The first phase balancing circuit includes a capacitor and a variable resistor.

10 Claims, 6 Drawing Sheets

BALANCING CIRCUIT FOR A METAL DETECTOR

RELATED APPLICATION

The present application is a divisional application of prior filed co-pending U.S. patent application Ser. No. 11/779,969, filed on Jul. 19, 2007, the entire content of which is hereby incorporated by reference.

BACKGROUND

The invention relates to a balancing circuit for a metal detector. Known metal detectors include an oscillator (or transmit) coil and two detector (or receive) coils. The receive coils are typically positioned on either side of the oscillator coil and substantially equidistant therefrom. The oscillator coil is provided with an oscillatory signal that is inductively coupled to the detector coils. Metal passing through the coils causes an imbalance in the inductively coupled signals, which can be used to detect the presence of the metal.

To operate properly, the inductively coupled signals should be balanced such that the signals produced by each receive coil are the same when metal is not present. Due to variances in tolerances, aging of materials, etc., it is necessary to provide a means of balancing the inductively coupled signals when no metal is present.

SUMMARY

In one embodiment, the invention provides a metal detector including an oscillating power source, a transmit coil connected to the oscillating power source, first and second receive coils inductively coupled to the transmit coil, a first amplitude balancing circuit connected to one of the first receive coil and the second receive coil, and a first phase balancing circuit connected to one of the first receive coil and the second receive coil, the first phase balancing circuit including a first capacitor and a first variable resistor.

In another embodiment, the invention provides a method of balancing a metal detector. The metal detector includes a transmit coil, first and second receive coils inductively coupled to the transmit coil, a differential circuit coupled to the first and second receive coils, a first amplitude balancing circuit coupled to one of the first receive coil and the second receive coil and including a first variable resistor, and a first phase balancing circuit coupled to one of the first receive coil and the second receive coil and including a capacitor. The method includes detecting a difference between a signal from the first receive coil and a signal from the second receive coil when there is no material in the metal detector, adjusting the first variable resistor to reduce the difference, adjusting the second variable resistor to reduce the difference, and repeating adjustment of the first and second variable resistors to reduce the difference.

In another embodiment the invention provides a signal adjuster for an inductor. The signal adjuster includes, an amplitude adjuster configured to provide a resistance between a lead of the inductor and ground, and a phase adjuster configured to provide a capacitance and a variable resistance between a lead of the inductor and ground. The variable resistance is configured to adjust a phase of a signal generated by the inductor.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In addition, it should be understood that embodiments of the invention include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. Similarly, some embodiments of the present invention described herein operate utilizing software. One of ordinary skill in the art, and based on a reading of this detailed description, would recognize that, in at least one embodiment, such embodiments could instead operate without software, instead utilizing electronic circuitry and other hardware configured to perform the same functions. As such, it should be noted that any number and combination of hardware-based devices, software-based devices, and structural components may be utilized to implement the various embodiments of the present invention. Also, although various components of the present invention are described and illustrated herein as being defined by modules, it will be appreciated that the modules described and illustrated herein can be configured in a significantly different manner, can be defined by one or more other modules performing additional tasks, and/or can be defined by fewer modules.

Figure 1:
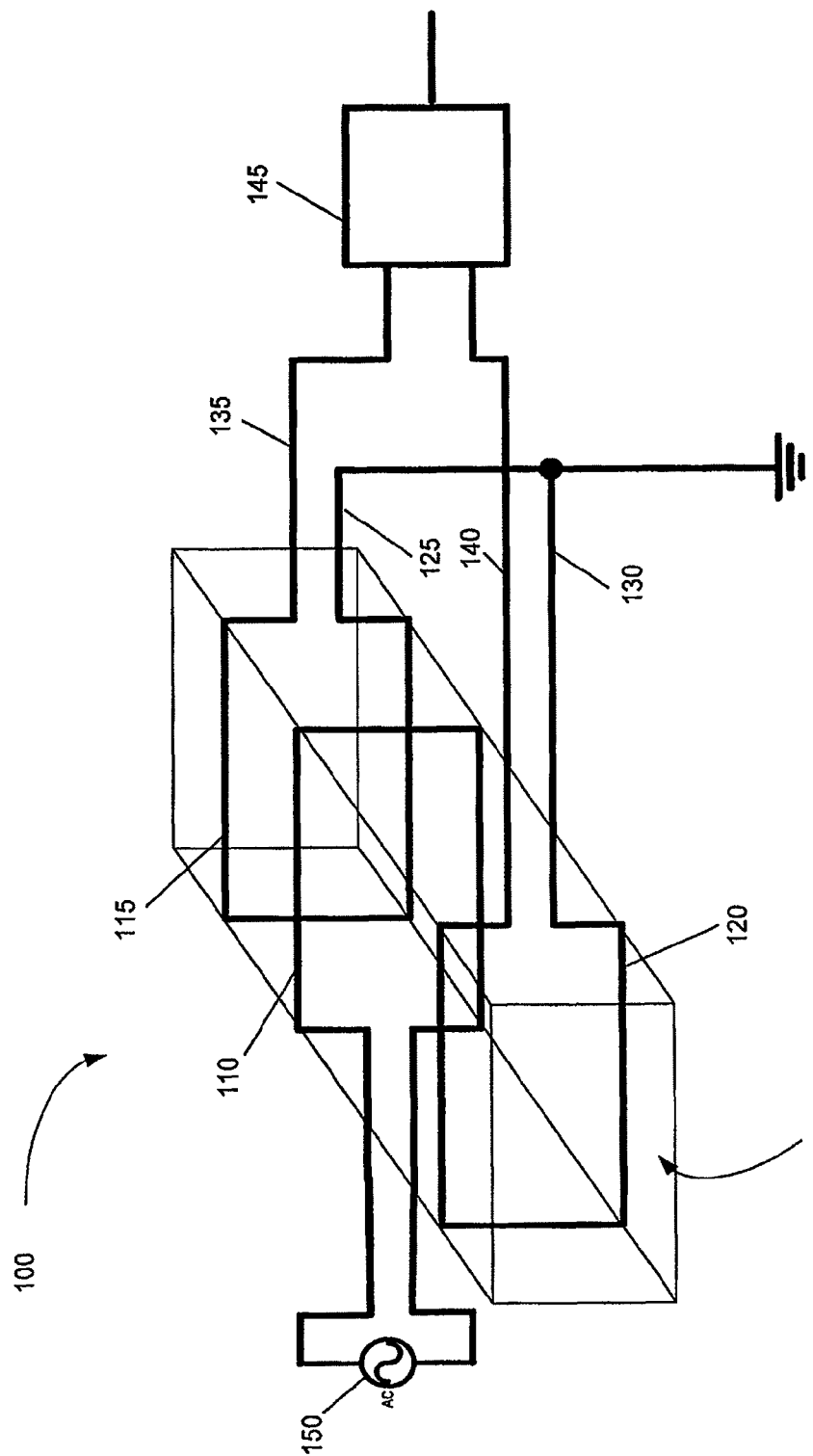
FIG. 1 is a schematic representation of a prior art metal detector.

FIG. 1 schematically illustrates a construction of a prior art metal detector 100. The metal detector 100 includes a passageway 105. A transmit coil 110 is centrally positioned around the passageway 105. A first receive coil 115 and a second receive coil 120 are positioned around the passageway 105 on opposite sides of the transmit coil 110, substantially equidistant from the transmit coil 110. A first lead 125 of the first receive coil 115 and a first lead 130 of the second receive coil 120 are connected to ground. A second lead 135 of the first receive coil 115 and a second lead 140 of the second receive coil 120 are connected to a differential circuit 145.

During operation of the metal detector 100, an oscillatory signal 150 (e.g. an AC signal) is supplied to the transmit coil 110. The transmit coil 110 transmits a signal, based on the oscillatory signal. The first receive coil 115 and the second receive coil 120 receive, via inductive coupling, the signal transmitted by the transmit coil 110. The first and second receive coils 115 and 120 each generates an output signal based on the signals they receive from the transmit coil 110. When there is no material, particularly no metallic material, in the passageway 105 (i.e., the passageway 105 is empty), the signals received by, and output by, the first and second receive coils 115 and 120 should be substantially equivalent. The differential circuit 145 compares the output of the first receive coil 115 to the output of the second receive coil 120, and outputs a signal indicative of a difference in the signals. In the case, where there is no material in the passageway 105, the signals should be substantially equivalent, and the differential circuit 145 outputs a signal with a zero or near zero signal (e.g, a zero amplitude analog signal or a digital zero value).

When a non-metal material (e.g., a food product) enters the passageway 105, the signals received by the first receive coil 115 and the second receive coil 120 differ. The amplitude of these signals can differ significantly but the phase angles of the signals will generally be different than the phase angle generated by a metal. Therefore, the outputs of the first receive coil 115 and the second receive coil 120, amplitude and phase angle, will differ. The differential circuit 145 then outputs a signal (e.g., analog or digital) indicative of the difference between the first receive coil 115 output and the second receive coil 120 output.

When a piece of metal (ferrous or non-ferrous) enters the passageway 105, the metal distorts the signal transmitted by the transmit coil 110, and therefore, the signals received by the first receive coil 115 and the second receive coil 120. The distortion is greater nearer the metal. Therefore, the receive coil nearer the metal receives a signal having a greater distortion than the receive coil that is farther away from the metal. Accordingly, the outputs of the first receive coil 115 and the second receive coil 120 can differ relatively significantly when metal is present in the passageway 105. The differential circuit 145 receives the different signals from the first receive coil 115 and the second receive coil 120 and generates an output (e.g., analog or digital) indicative of the difference. The metal detector 100 receives the relatively large output of the differential circuit 145 and detects the presence of metal in the passageway 105, taking appropriate action (e.g., sounding an alarm, stopping a conveyor, etc.).

The signals received by, and output by, the first receive coil 115 and the second receive coil 120, should be equivalent when there is no material in the passageway 105. Thus, the differential circuit 145 should output a zero signal when there is no material in the passageway 105. However, differences in the signals output by the first and second receive coils 115 and 120 can occur, even when there is no material in the passageway 105. For example, variances in the tolerances of the first receive coil 115 and the second receive coil 120, as well as in manufacturing the metal detector 100 (e.g., the positioning of the receive coils 115 and 120 relative to the transmit coil 110), can result in differences in the signals received by, and output by, the receive coils 115 and 120. In addition, changes in temperature can also result in differences in the signals received by, and output by, the receive coils 115 and 120.

The signals output by the receive coils include two components that should match in order for the differential circuit 145 to output a relatively zero signal. The components are (1) the amplitudes of the signals and (2) the phases of the signals. Reducing and/or removing the variations in the amplitude and/or phase of the outputs of the first receive coil 115 and/or the second receive coil 120, when no material is present in the passageway 105, improves the ability of the metal detector 100 to detect when metal is actually present in the passageway 105.

Figure 2:
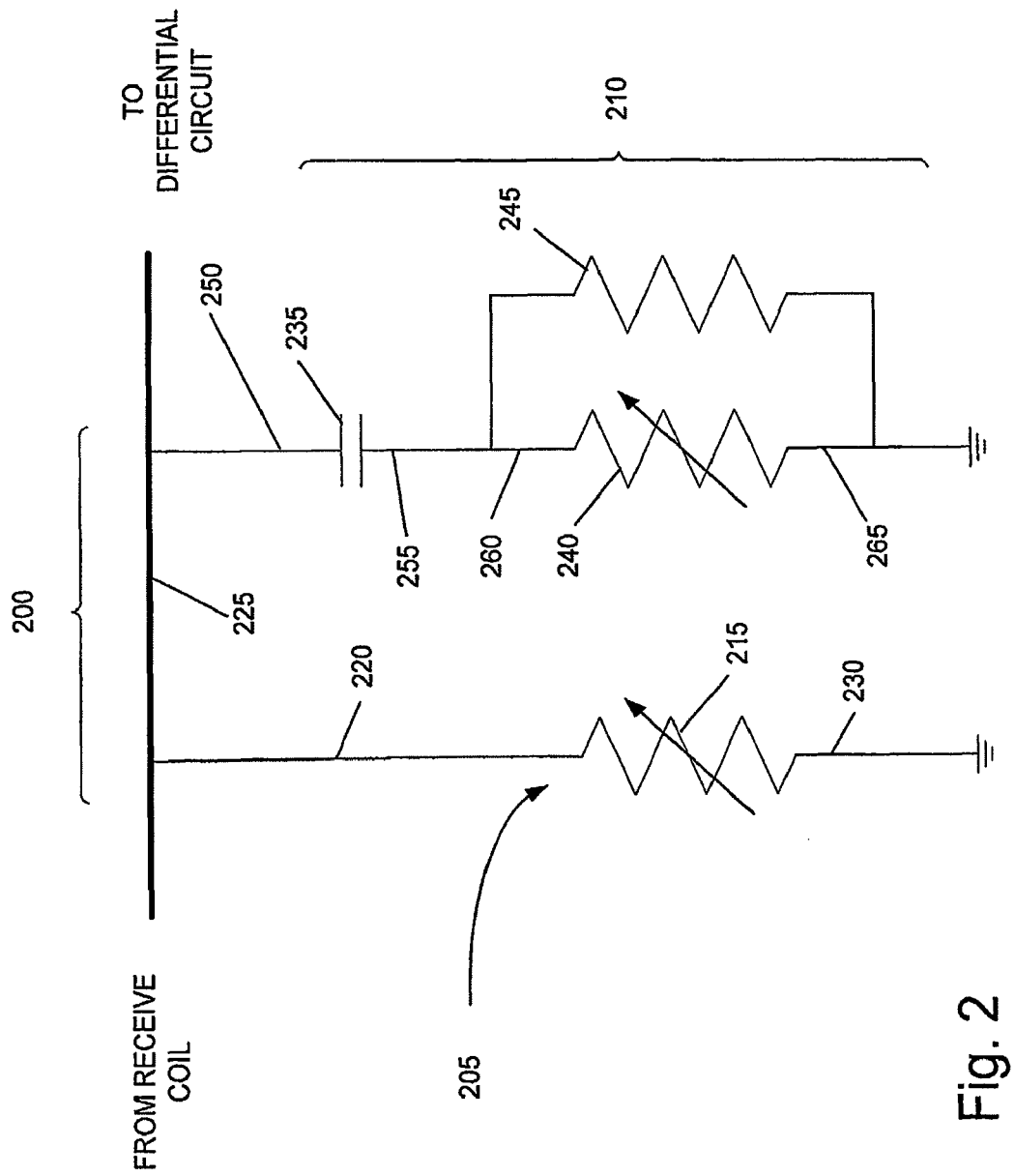
FIG. 2 is a schematic diagram of a construction of a balancing circuit according to the invention.

A balancing circuit can be used to adjust the outputs of the first receive coil 115 and the second receive coil 120, such that the amplitude and phase of the output signals match when there is no material in the passageway 105. FIG. 2 illustrates a construction of a balancing circuit 200. The balancing circuit 200 includes an amplitude balancing circuit 205 and a phase balancing circuit 210. The amplitude balancing circuit 205 includes a variable resistor 215 (e.g., a 0-20 k Ω model AD5262 manufactured by Analog Devices) having a wiper 220 connected to a receive coil 225 and a second lead 230 connected to ground.

The phase balancing circuit 210 includes a capacitor 235 (e.g., 2 to 20 nanofarad), a variable resistor 240 (e.g., a 0-20 k Ω model AD5262 manufactured by Analog Devices), and a fixed resistor 245 (e.g., 100 Ω). A first lead 250 of the capacitor 235 is connected to the receive coil 225. A second lead 255 of the capacitor 235 is connected to a wiper 260 of the variable resistor 240. A second lead 265 of the variable resistor 240 is connected to ground. The fixed resistor 245 is connected across the variable resistor 240.

Figure 3:
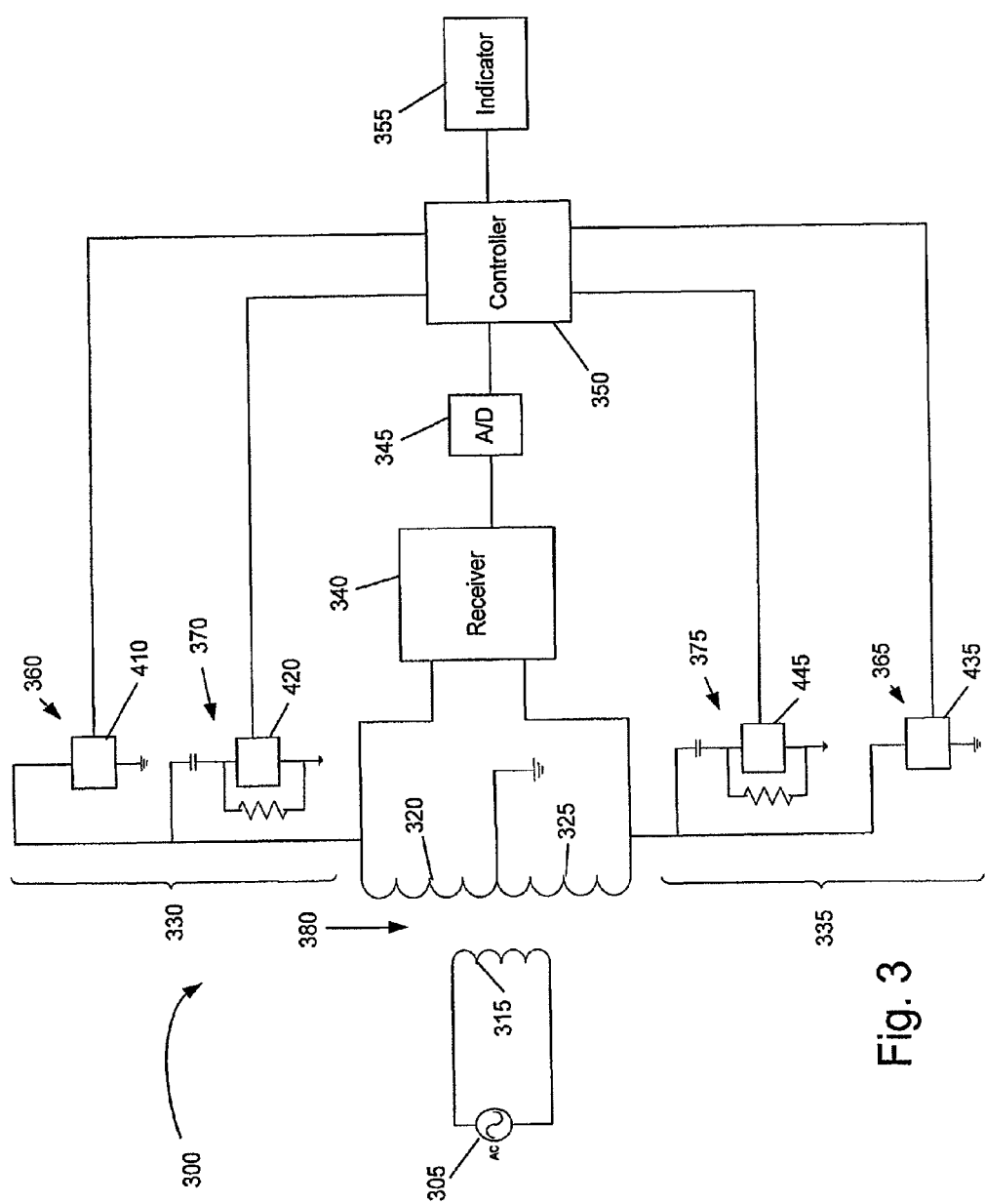
FIG. 3 is a partial schematic diagram, partial block diagram of a construction of a metal detector according to the invention.

FIG. 3 illustrates a construction of a metal detector 300 embodying the present invention. The metal detector 300 includes an oscillatory power source 305, a transmit coil 315, a first receive coil 320, a second receive coil 325, a first balancing circuit 330, a second balancing circuit 335, a receiver circuit 340, an analog-to-digital (A/D) converter 345, a controller 350, and an indicator 355.

The oscillatory power source 305 provides an oscillatory signal (e.g., an AC signal) to the transmit coil. The transmit coil 315 transmits a signal which is received by the first receive coil 320 and the second receive coil 325. The first receive coil 320 and the second receive coil 325 provide output signals, to the receive circuit 340, based on the signals they receive from the transmit coil 315. The receive circuit 340 amplifies any imbalance in the signals received from the first receive coil 320 and the second receive coil 325. The amplified differential signal is provided to the A/D converter 345 where it is converted into a digital value indicative of the amplitude of the amplified differential signal. The digital value is then provided to the controller 350, which is also connected to the indicator 355, and the first and second balancing circuits 330 and 335. The controller 350 reduces and/or removes differences between the output signals (i.e., balances the signals) of the first receive coil 320 and the second receive coil 325, when there is no material present in a passageway 380, by adjusting one or more of an amplitude balancing circuit 360 and a phase balancing circuit 370, of the first balancing circuit 330, and an amplitude balancing circuit 365 and a phase balancing circuit 375, of the second balancing circuit 335.

Figure 4:
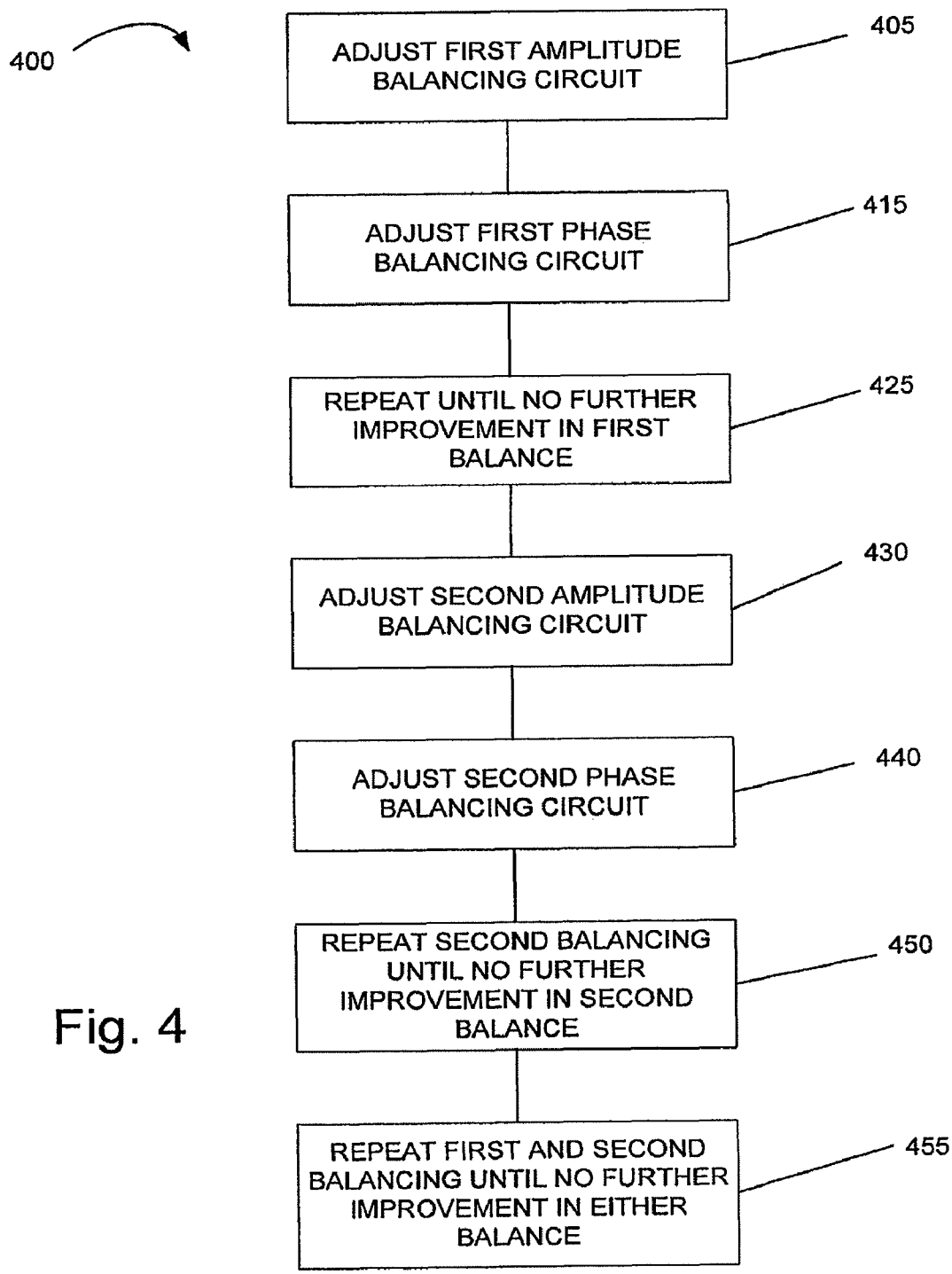
FIG. 4 is a flow chart of a first embodiment of a process for balancing the metal detector of FIG. 3.

FIG. 4 is a flow chart of an embodiment of a balancing operation 400 for the metal detector 300. The controller 350 begins by adjusting the first amplitude balancing circuit 360 (block 405) (e.g., adjusting the resistance of a variable resistor 410). The controller 350 monitors the amplified differential signal received from the A/D converter 345 and adjusts the first amplitude balancing circuit 360 until an amplitude of the differential signal is as low as can be achieved by adjusting the balancing circuit 360.

Next the controller 350 adjusts the first phase balancing circuit 370 (block 415) (e.g., adjusting the resistance of a variable resistor 420). The controller 350 monitors the amplified differential signal received from the A/D converter 345 and adjusts the first phase balancing circuit 370 until the amplitude of the differential signal is as low as can be achieved by adjusting the balancing circuit 370. The controller 350 then determines if adjusting the first amplitude balancing circuit 360 and/or the first phase balancing circuit 370 reduced the amplitude of the differential signal (block 425). If the amplitude of the differential signal was reduced, the controller 350 repeats the previous process beginning at block 405 with adjusting the first amplitude balancing circuit 360.

If the amplitude of the differential signal was not reduced, the controller 350 adjusts the second amplitude balancing circuit 365 (block 430) (e.g., adjusting the resistance of a variable resistor 435). The controller 350 monitors the amplified differential signal received from the A/D converter 345 and adjusts the second amplitude balancing circuit 365 until an amplitude of the differential signal is as low as can be achieved by adjusting the balancing circuit 365.

Next the controller 350 adjusts the second phase balancing circuit 375 (block 440) (e.g., adjusting the resistance of a variable resistor 445). The controller 350 monitors the amplified differential signal received from the A/D converter 345 and adjusts the second phase balancing circuit 375 until the amplitude of the differential signal is as low as can be achieved by adjusting the balancing circuit 375. The controller 350 then determines if adjusting the second amplitude balancing circuit 365 and/or the second phase balancing circuit 375 reduced the amplitude of the differential signal (block 450). If the amplitude of the differential signal was reduced, the controller 350 repeats the previous process beginning at block 430 with adjusting the second amplitude balancing circuit 365.

If the amplitude of the differential signal was not reduced, the controller 350 determines if the amplitude of the differential signal was reduced while repeating blocks 440 and 450 (i.e., since last adjusting the first amplitude balancing circuit 360 and/or the first phase adjusting circuit 370). If the amplitude of the differential signal was reduced while repeating blocks 440 and 450, the controller 350 repeats the whole process beginning at block 405 with adjusting the first amplitude balancing circuit 360. If the differential signal was not reduced, the receive coils are balanced, the process is complete, and the sensitivity of the metal detector 300 is maximized.

Figure 5A:
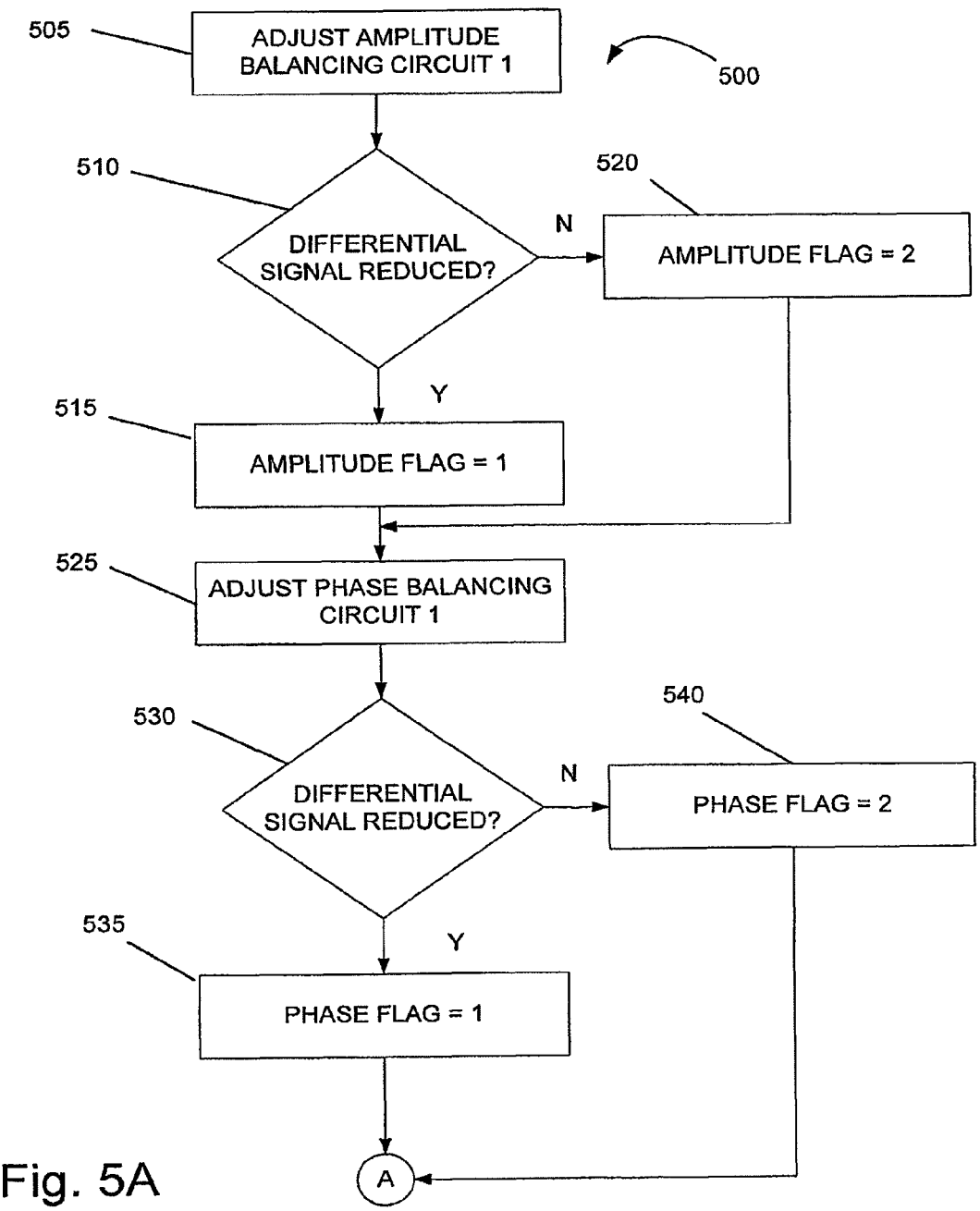
FIGS. 5A and 5B are a flow chart of a second embodiment of a process for balancing the metal detector of FIG. 3.
Figure 5B:
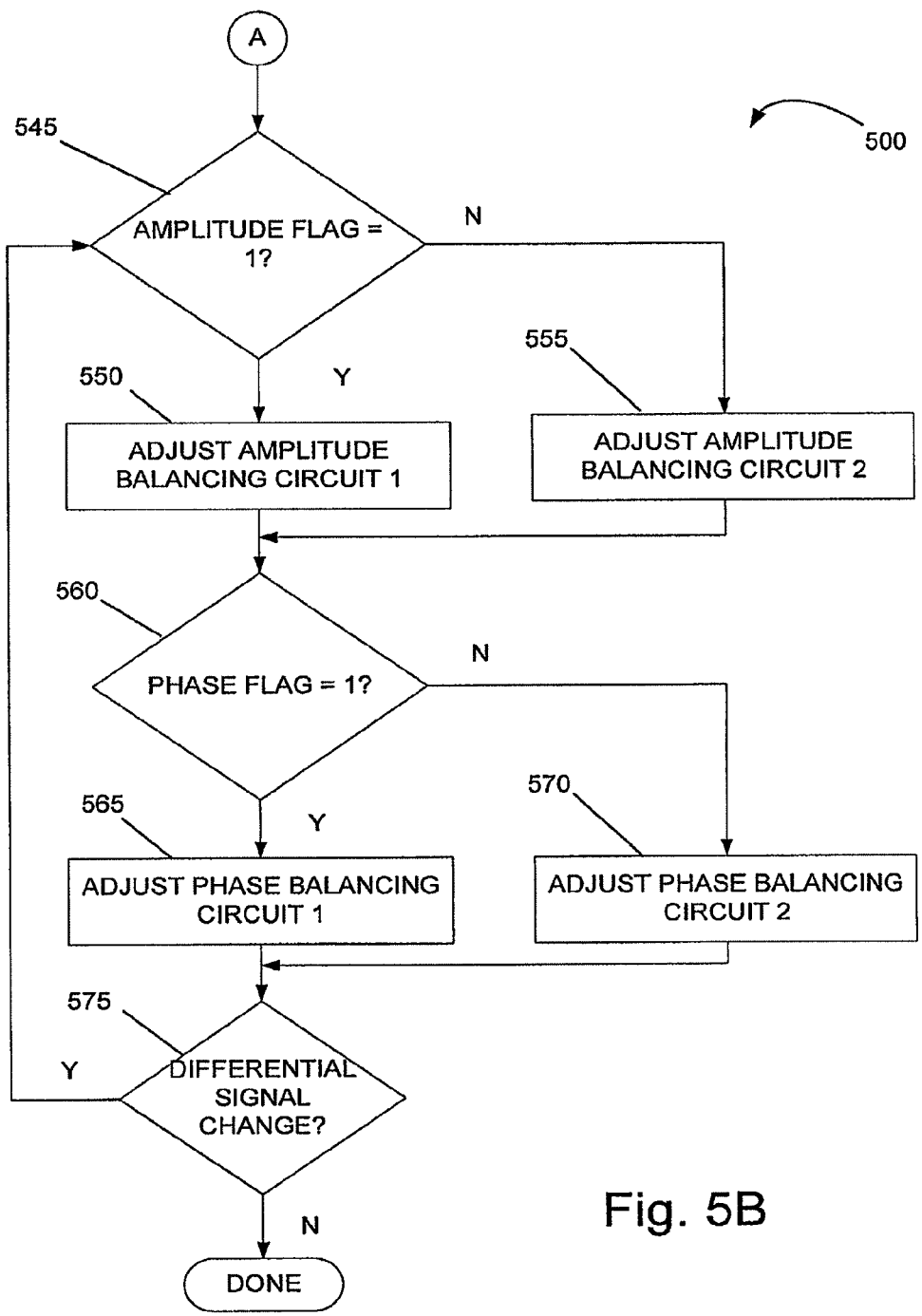

FIGS. 5A and 5B illustrate a flow chart of another embodiment of a balancing operation 500. The controller 350 begins by adjusting the first amplitude balancing circuit 360 (block 505) (e.g., adjusting the resistance of the variable resistor 410). The controller 350 monitors the amplified differential signal received from the A/D converter 345 and adjusts the first amplitude balancing circuit 360 until an amplitude of the differential signal is as low as can be achieved by adjusting the balancing circuit 360. The controller 350 then determines if adjusting the first amplitude balancing circuit 360 reduced the amplitude of the differential signal (block 510). If the amplitude of the differential signal was reduced, the controller 350 sets an amplitude flag to one (block 515). If the amplitude of the differential signal was not reduced, the controller 350 sets the amplitude flag to two (block 520).

Next the controller 350 adjusts the first phase balancing circuit 370 (block 525) (e.g., adjusting the resistance of the variable resistor 420). The controller 350 monitors the amplified differential signal received from the A/D converter 345 and adjusts the first phase balancing circuit 370 until the amplitude of the differential signal is as low as can be achieved by adjusting the balancing circuit 370. The controller 350 then determines if adjusting the first phase balancing circuit 370 reduced the amplitude of the differential signal (block 530). If the amplitude of the differential signal was reduced, the controller 350 sets a phase flag to one (block 535). If the amplitude of the differential signal was not reduced, the controller 350 sets the phase flag to two (block 540).

The controller 350 then checks the amplitude flag (block 545). If the amplitude flag equals one, the controller 350 adjusts the first amplitude balancing circuit 360 (block 550) until the differential signal is as low as can be achieved by adjusting the balancing circuit 360. If the amplitude flag equals two, the controller adjusts the second amplitude balancing circuit 365 (block 555) (e.g., by adjusting the variable resistor 435) until the differential signal is as low as can be achieved by adjusting the balancing circuit 365.

The controller 350 then checks the phase flag (block 560). If the phase flag equals one, the controller 350 adjusts the first phase balancing circuit 370 (block 565) until the differential signal is as low as can be achieved by adjusting the balancing circuit 370. If the phase flag equals two, the controller adjusts the second phase balancing circuit 375 (block 5705) (e.g., by adjusting the variable resistor 445) until the differential signal is as low as can be achieved by adjusting the balancing circuit 375.

Next the controller 350 checks if any change in the amplitude of the differential signal was achieved by adjusting one of the amplitude balancing circuits 360 or 365 and/or by adjusting one of the phase balancing circuits 370 or 375 (block 575). If there was a change (i.e., reduction) in the amplitude of the differential signal, the controller 350 repeats the adjustment process beginning at block 545. If there was no change, the process is complete and the receive coils are balanced.

The controller 350, as discussed above can be in the form of a microcontroller or microprocessor and can include other components such as a power supply, memory, an A/D converter, and filters. Further, it is envisioned that components shown in the embodiments above can be combined and/or separated resulting in different arrangements of the circuits.

The invention has been described in constructions and embodiments of metal detectors; however, the invention has application in other types of metal detectors and other inductor systems requiring amplitude and/or phase adjustment.

The values of components above are given by way of example only and different combinations and values of components (e.g., resistances and capacitances) are contemplated in the invention.

Thus, the invention provides, among other things, a new and useful balancing circuit for a metal detector. Various features and advantages of the invention are set forth in the following claims.

What is claimed is:
1. A signal adjuster for an inductor, comprising:
an amplitude adjuster including a resistor directly coupled to a first lead of the inductor and to ground; and
a phase adjuster having a capacitor and a variable resistor coupled in series, one of the capacitor and the variable resistor directly coupled to the first lead of the inductor and the other of the capacitor and the variable resistor directly coupled to ground, the variable resistor configured to adjust a phase of a signal generated by the inductor.

2. The signal adjuster of claim 1, wherein the phase is adjusted by changing a resistor-capacitor time constant of the capacitor in series with the variable resistor.

3. The signal adjuster of claim 2, further comprising a fixed resistor connected in parallel with the variable resistor.

4. The signal adjuster of claim 1, wherein the resistor is a variable resistor.

5. The signal adjuster of claim 1, wherein a second lead of the inductor is connected to ground.

6. A method of adjusting a signal generated by an inductor, comprising:
   modifying a resistance of a first resistor directly coupled to a first lead of the inductor and to ground to adjust an amplitude of the signal; and
   modifying a resistance of a second resistor coupled in series to a capacitor, one of the second resistor and the capacitor directly coupled to the first lead of the inductor and the other of the second resistor and the capacitor directly coupled to ground, the resistance of the second resistor adjusting a phase of the signal.

7. The method of claim 6, wherein the phase is adjusted by changing a resistor-capacitor time constant of the capacitor and the second resistor.

8. The method of claim 7, further comprising a third resistor connected in parallel with the second resistor, the third resistor being fixed.

9. The method of claim 6, wherein the first resistor and the second resistor are variable resistors.

10. The method of claim 6, wherein a second lead of the inductor is connected to ground.

* * * * *